United States Patent [19]
Li et al.

[11] Patent Number: 5,768,223
[45] Date of Patent: Jun. 16, 1998

[54] AUDIO DEVICE

[76] Inventors: Yi-Yang Li, No. 7, Lane 15, Chang-Chun St., Hsin-Chu City; Pi-Hsiung Hsieh, 3F. No. 4 Alley 2J, Lane 119, Chulin Rd., Yung Ho, Taipei, both of Taiwan; Gary Alan Fisher, #4E Tower, Parc Oasis, Tat Chee Ave., Kowloon, Hong Kong

[21] Appl. No.: 794,353

[22] Filed: Feb. 4, 1997

Related U.S. Application Data

[63] Continuation-in-part of Ser. No. 503,331, Jul. 17, 1995, Pat. No. 5,631,883, which is a continuation of Ser. No. 276,420, Jul. 18, 1994, which is a continuation of Ser. No. 995,134, Dec. 22, 1992, abandoned.

[51] Int. Cl.$^6$ ............................................. G11B 17/22
[52] U.S. Cl. .............................. 369/31; 369/64; 434/311
[58] Field of Search ........................... 369/31, 63, 64, 369/65, 66, 67, 68, 69, 70; 434/317, 311, 178, 335, 169

[56] References Cited

U.S. PATENT DOCUMENTS

| | | | |
|---|---|---|---|
| 4,355,984 | 10/1982 | Slavik et al. | 434/335 |
| 4,636,881 | 1/1987 | Brefka et al. | 360/74.1 |
| 4,703,573 | 11/1987 | Montgomery et al. | 434/169 |
| 4,809,246 | 2/1989 | Jeng | 369/31 |
| 4,884,974 | 12/1989 | Desmet | 434/317 |
| 5,209,665 | 5/1993 | Billings et al. | 434/169 |

*Primary Examiner*—Tan Dinh
*Attorney, Agent, or Firm*—Beveridge, DeGrandi, Weilacher & Young, LLP

[57] ABSTRACT

An audio device includes a plurality of control cards and an audio unit. Each control card has an edge margin provided with an identification label for identifying the same. The identification label includes an insulator portion and at least two electrically connected conductive strips on the insulator portion. The audio unit includes an audio housing formed with a card slot to permit extension of the edge margin of one of the control cards into the audio housing, and a memory module disposed in the audio housing for storing digitized audio data corresponding to the control cards therein. A control circuit controls the output of the digitized audio data from the memory module. A plurality of electrically conductive stripes connect the control circuit to the identification label on the edge margin of the control card that is extended into the card slot of the audio housing. The conductive strips of the identification label connect electrically some of the conductive stripes so as to generate a unique card identifying signal that is received by the control circuit and that is used to activate the control circuit for controlling the memory module to output a selected one of the digitized audio data in accordance with the card identifying signal.

19 Claims, 13 Drawing Sheets

AUDIO DEVICE

CROSS-REFERENCE TO RELATED APPLICATION

This application is a continuation-in-part application of copending U.S. patent application Ser. No. 08/503,331, filed on Jul. 17, 1995, and which issued on May 20, 1997 as U.S. Pat. No. 5,631,883, which application was in turn a continuation of U.S. patent application Ser. No. 08/276,420, filed Jul. 18, 1994, which application was in turn a continuation application of U.S. patent application Ser. No. 07/995,134, filed on Dec. 22, 1992, abandoned.

BACKGROUND OF THE INVENTION

1. Field of the Invention

The invention relates to an audio device, more particularly to an audio device which includes a plurality of control cards and an audio unit.

2. Description of the Related Art

In U.S. Pat. No. 4,884,974 issued to DeSmet, there is disclosed a talking book and audio player assembly which comprises a book, a ROM module and an audio player. The book has a hard back cover and a plurality of pages, each having a printed text and a bar code printed along the end margin of the page and formed by a series of light reflective and non-reflective elements that identify the page. The ROM module is secured to the end margin of the back cover and has exposed terminals. The ROM module has a plurality of digitized spoken messages stored therein. Each digitized spoken message corresponds to the printed text on a respective page of the book. The audio player has a base inlet adapted to receive the end margin of the back cover and provided with inlet contacts for engaging the terminals of the ROM module when the pages of the book overlie the inlet. The audio player further has electronic means connected to the ROM module through the inlet contacts to read out the digitized messages from the ROM module and convert these messages into audio signals which are reproduced by a loudspeaker and heard by a reader as spoken messages. The audio player includes a light sensor array which is laterally displaced from the bar code so as not to interfere with the pages overlying the inlet and which is in operative optical relation to the bar code on the opened page to produce a page-identifying signal which effects selection for read-out from the ROM module of the digitized message corresponding to the printed text on the opened page.

The assembly of the DeSmet patent utilizes an optical sensor for identifying the opened page, and requires operation of a separate button which acts as an ON/OFF switch before spoken messages can be heard by the reader, thereby resulting in inconvenience to the reader, especially to children. In addition, the ROM module which is secured to the back cover is rather expensive and breaks easily. As such, the assembly of the DeSmet patent has a relatively complex structure and is thus expensive to manufacture. Moreover, the reliability of the optical sensor in the DeSmet patent depends on the ambient light.

In U.S. Pat. No. 4,809,246 issued to Jeng, there is disclosed a sound illustrated book which comprises a plurality of sheets bearing printed matter, an audio sound reproducing circuit having recorded messages related to the printed matter, and a page indicator circuit that comprises a decoder connected to the audio sound reproducing circuit, and a code generator connected to the decoder. The code generator generates a unique code corresponding to the opened sheet. The unique code is transmitted to the decoder, and a recorded message relating to the matter printed on the opened sheet is played by the audio sound reproducing circuit according to a decoded signal from the decoder.

In one embodiment, the code generator comprises a photosensitive array and a perforated block having differently arranged apertures on each sheet of the book. One end of each photosensitive element of the array is grounded while the other end is connected to both a power source through a pull-up resistor and the decoder. The unique code is generated as the photosensitive array is placed under the perforated block of any one of the sheets with adequate illumination.

Like the aforementioned assembly of the DeSmet patent, an optical sensor is utilized for identifying the opened sheet, and operation of a separate ON/OFF switch is needed before spoken messages can be heard by the user. Furthermore, an increase in the number of sheets of the book requires a corresponding increase in the number of photosensitive elements, along with the circuitry that is associated with the photosensitive elements. As such, the sound illustrated book according to the Jeng patent has a relatively complex structure and is also expensive to manufacture. Moreover, the reliability of the optical sensor similarly depends on the ambient light.

SUMMARY OF THE INVENTION

The main object of the present invention is to provide an audio device which is easy to operate and which has a relatively simple structure and is inexpensive to manufacture.

Another object of the present invention is to provide an audio device which does not employ optical sensors to ensure proper operation of the audio device even in poor ambient light conditions.

Accordingly, the audio device of the present invention comprises:

a plurality of control cards, each of which has an edge margin provided with an identification label for identifying the control cards, the identification label including an insulator portion and at least two electrically connected conductive strips on the insulator portion; and an audio unit including: an audio housing formed with a card slot to permit extension of the edge margin of one of the control cards into the audio housing; a memory module disposed in the audio housing for storing digitized audio data corresponding to the control cards therein; a control circuit disposed in the audio housing and connected electrically to the memory module to control output of the digitized audio data from the memory module; a plurality of electrically conductive stripes provided in the audio housing for connecting the control circuit to the identification label on the edge margin of the control card that is extended into the card slot of the audio housing, the conductive strips of the identification label connecting electrically some of the conductive stripes so as to generate a unique card identifying signal that is received by the control circuit and that is used to activate the control circuit for controlling the memory module to output a selected one of the digitized audio data in accordance with the card identifying signal; and speaker means disposed in the audio housing and connected electrically to the memory module for converting and reproducing the digitized audio data outputted by the memory module into an audible sound output.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
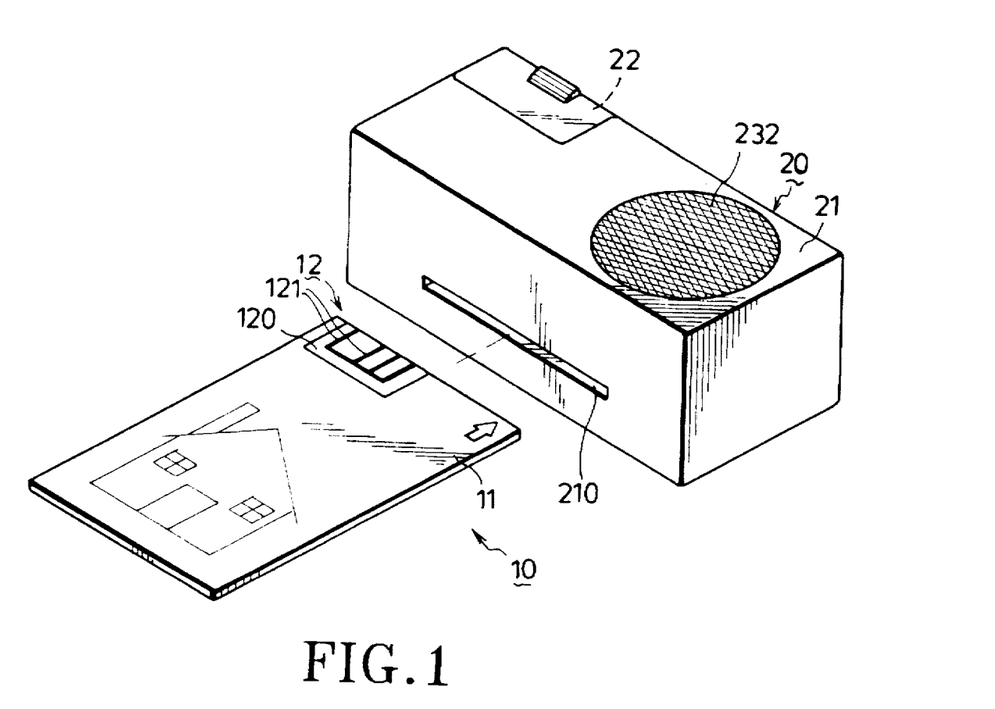
FIG. 1 is a perspective view of the first preferred embodiment of an audio device according to the present invention.

Referring to FIG. 1, the first preferred embodiment of an audio device according to the present invention is shown to comprise a plurality of control cards 10 (only one is shown) and an audio unit 20. The control cards 10 are preferably separate from each other, although bound control cards may also be used.

In this embodiment, the control card 10 is formed as a stiff plastic or cardboard piece which has an edge margin 11 with a top side that is provided with an identification label 12 for identifying the control card 10. The identification label 12 includes an insulator portion 120, such as an insulator tape attached to the edge margin 11, and at least two electrically connected conductive strips 121 provided on the insulator portion 120, such as by printing. The number of conductive strips 121, the relative positions of the conductive strips 121, and the distances among the conductive strips 121 on the insulator portion 120 are varied for each identification label 12 so as to assign a unique code for each control card 10.

The audio unit 20 includes an audio housing 21 that is formed with a card slot 210 to permit extension of the edge margin 11 of one of the control cards 10 into the audio housing 21. The audio housing 21 further has a battery chamber 22 for receiving a cell unit (not shown) that is used to supply electrical power to the various active components of the audio unit 20 in a known manner, and a speaker unit 232 mounted on the audio housing 21.

Figure 2:
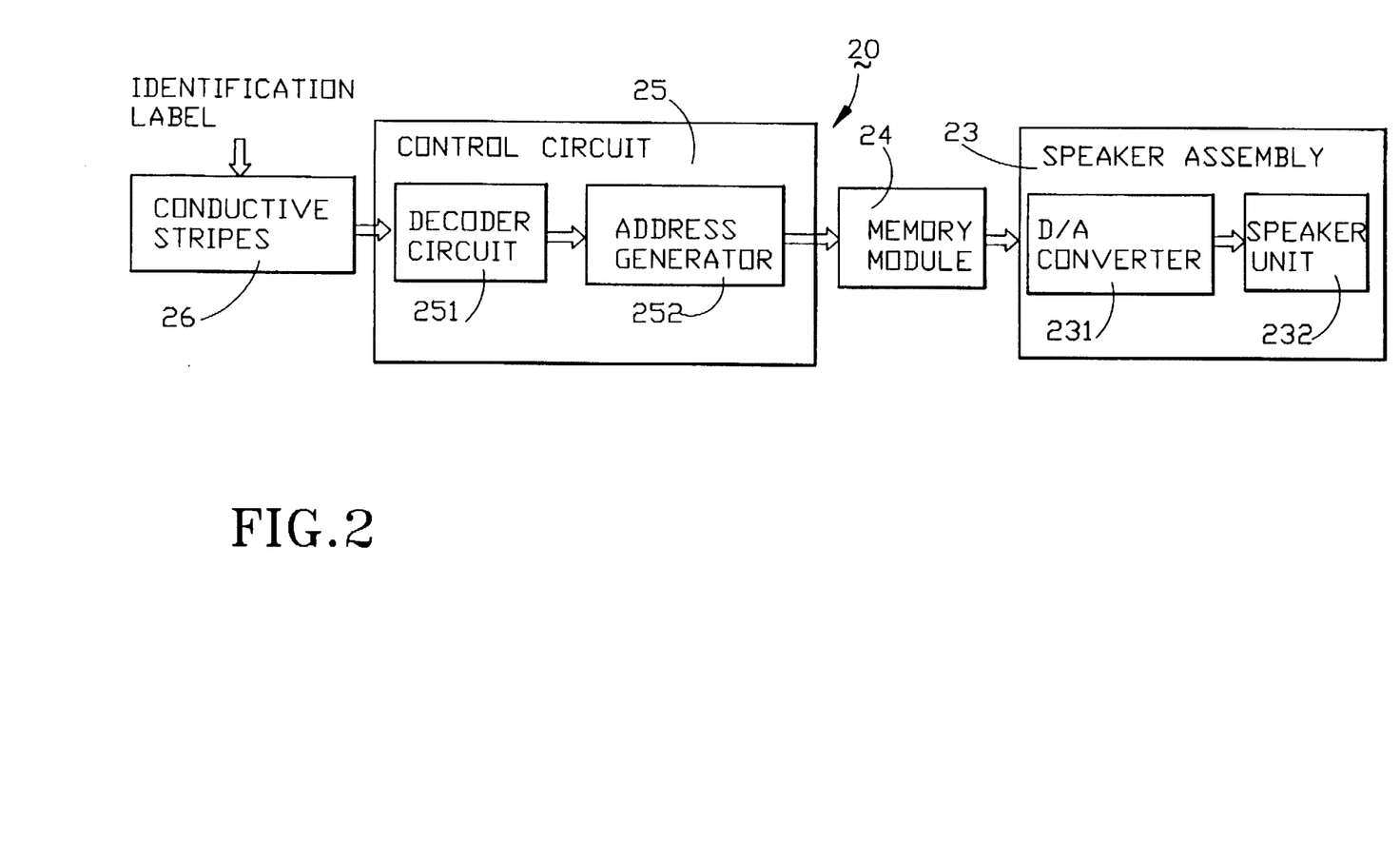
FIG. 2 is a schematic circuit block diagram of an audio unit of the first preferred embodiment.

FIG. 2 illustrates a schematic circuit block diagram of the audio unit 20. As shown, the audio unit 20 further includes a memory module 24, a control circuit 25 which includes a decoder circuit 251 and an address generator 252, a plurality of electrically conductive stripes 26, and a speaker assembly 23 which includes a digital-to-analog (D/A) converter 231 and the speaker unit 232. The speaker assembly 23, the memory module 24, the control circuit 25 and the conductive stripes 26 are mounted on a printed circuit board 27 that is disposed in the audio housing 21 (see FIG. 4).

In this embodiment, the memory module 24 is a non-volatile memory, such as a read-only memory (ROM), which has a plurality of addressable memory regions for storing digitized audio data corresponding to the control cards 10 therein. Preferably, each of the digitized audio data corresponds to printed matter on a respective one of the control cards 10. For example, the digitized audio data may be digitized spoken messages corresponding to printed text on the respective one of the control cards 10. Alternatively, the digitized audio data may be digitized spoken information corresponding to a picture on the respective one of the control cards 10. These arrangements permit use of the present invention as a learning tool for children. The digitized audio data may also be in the form of digitized music, e.g. songs, instrument sounds, that correspond to the control cards 10.

Figure 3:
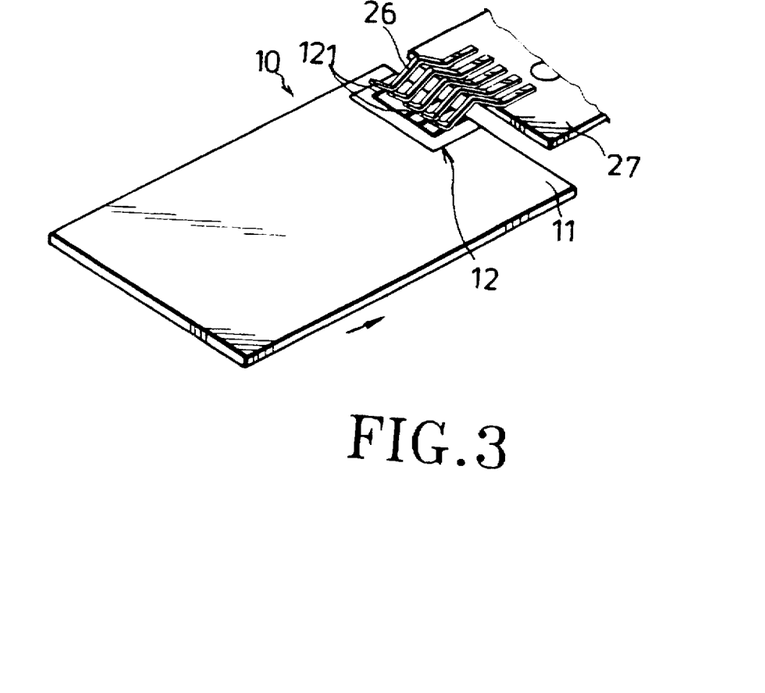
FIG. 3 is a perspective view which illustrates how electrical connection between conductive stripes of the audio unit and an identification label on a control card is established in the first preferred embodiment.
Figure 4:
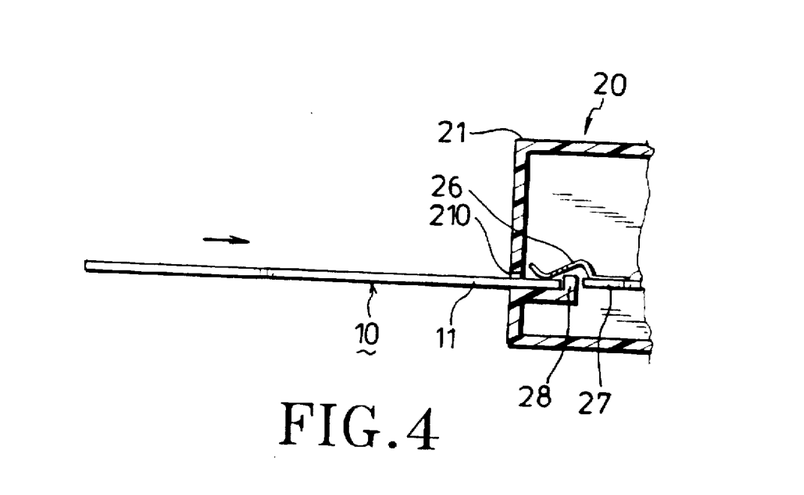
FIG. 4 is a schematic view of the first preferred embodiment.

The control circuit 25 is connected electrically to the memory module 24 and controls the output of the digitized audio data from the latter. The conductive stripes 26 connect the control circuit 25 to the identification label 12 on the edge margin 11 of the control card 10 that is inserted into the card slot 210 of the audio housing 21. In this embodiment, the conductive stripes 26 are formed as resilient conductive fingers, as shown in FIG. 3. The conductive strips 121 of the identification label 12 connect electrically some of the conductive stripes 26 so as to generate a unique card identifying signal that is received by the decoder circuit 251 of the control circuit 25 and that enables the latter to activate the address generator 252, which is connected electrically to the memory module 24, so as to access one of the memory regions of the memory module 24 and output the digitized audio data that corresponds to the card identifying signal. As shown in FIG. 4, the audio housing 21 is provided with a limiting member 28 adjacent to the card slot 210 for limiting entry of the edge margin 11 of the control card 10 into the audio housing 21 in order to ensure proper electrical contact between the identification label 12 and the conductive stripes 26.

The D/A converter 231 of the speaker assembly 23 is connected electrically to the memory module 24 for converting the digitized audio data that is outputted by the latter into an analog audio signal. The analog audio signal is used to drive the speaker unit 232 so as to generate an audible sound output.

It should be noted that the shape of the audio housing 21 should not be limited to the rectangular housing shown in FIG. 1. The shape of the audio housing 21 may be varied to enhance the commercial appeal of the audio device of the present invention. For example, when the control cards 10 are used as baseball cards, the audio housing 21 may be in the form of a baseball. Furthermore, the control circuit 25 may be easily implemented by a skilled artisan in the form of a microprocessor.

Figure 5:
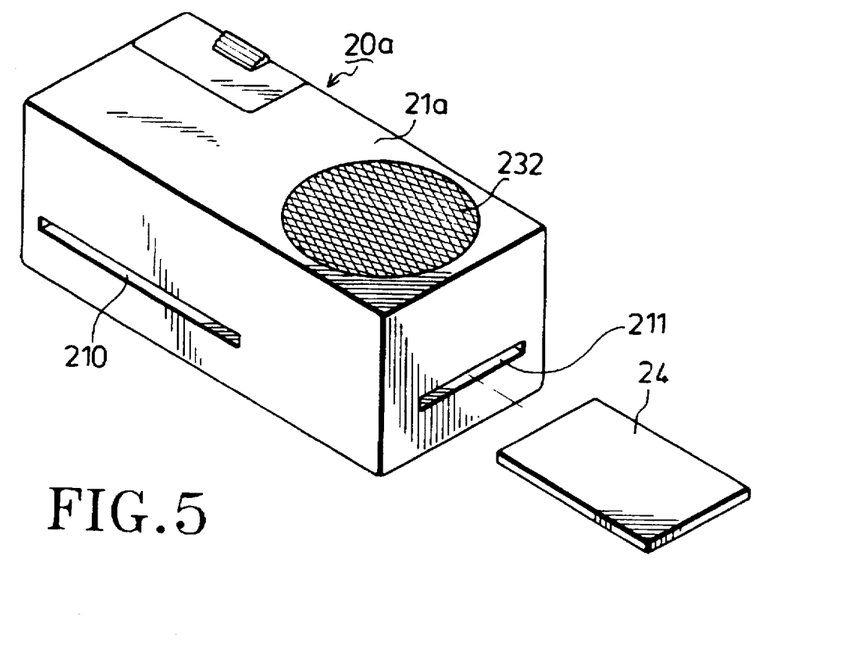
FIG. 5 is a perspective view of an audio unit of the second preferred embodiment of an audio device according to the present invention.

FIG. 5 illustrates an audio unit 20a according to the second preferred embodiment of the present invention. The audio unit 20a is generally similar to the audio unit 20 of the previous embodiment, except that the memory module 24 is mounted removably and replaceably in the audio housing 21.

Figure 6:
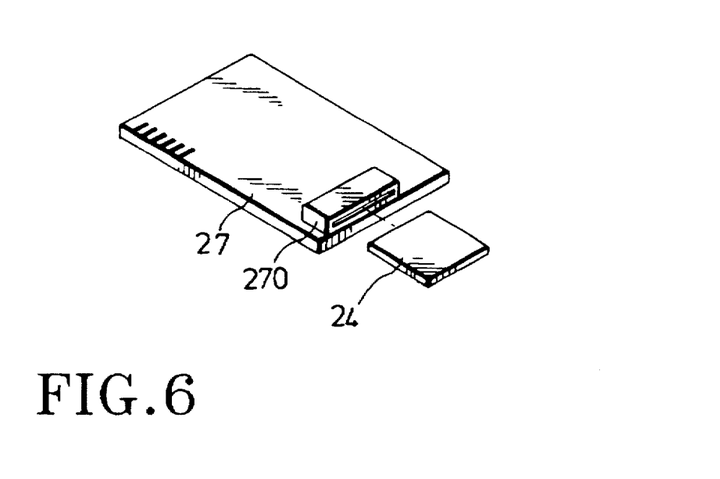
FIG. 6 is a perspective view which illustrates how a replaceable memory module of the second preferred embodiment is secured to a circuit board of the audio unit.

As shown in FIGS. 5 and 6, the audio housing 21a is further formed with a memory slot 211, and the memory module 24 is formed as an integrated circuit card that is inserted removably and replaceably into the memory slot 211 so as to engage a connector 270 on the circuit board 27 in the audio housing 21a. As such, since the capacity of the memory module 24 is limited, replacement of the memory module 24 permits use of the audio unit 20a with different sets of control cards.

Figure 7:
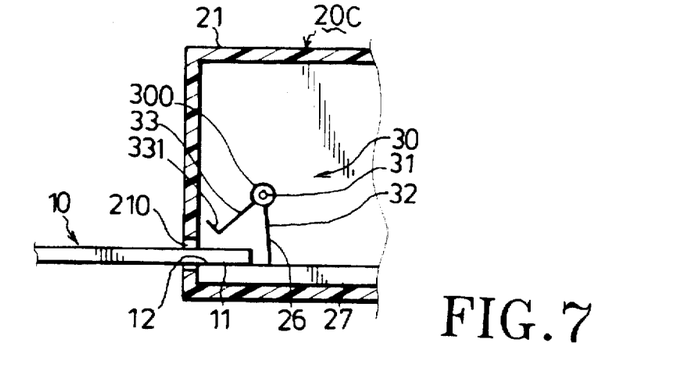
FIG. 7 is a schematic view of the third preferred embodiment of an audio device according to the present invention.

FIG. 7 illustrates an audio unit 20c of an audio device according to the third preferred embodiment of the present invention. In this embodiment, the conductive stripes 26 are printed on the circuit board 27 in the audio housing 21 and extend toward the card slot 210. The identification label 12 is provided on a bottom side of the edge margin 11 of the control card 10.

The audio unit 20c is provided with a push assembly which pushes the edge margin 11 of an inserted one of control cards 10 toward the conductive stripes 26 so as to establish proper electrical contact between the identification label 12 and the conductive stripes 26. In this embodiment, the push assembly includes an axle 31 and a push member 30. The axle 31 is mounted in the audio housing 21 parallel to the card slot 210 and is disposed adjacent to the card slot 210 and above the circuit board 27. The push member 30 includes a sleeve portion 300 which is sleeved rotatably on the axle 31, a swing arm portion 32 which extends radially and downwardly from the sleeve portion 300, and a press arm portion 33 which extends radially from the sleeve portion 300 and which forms an angle with the swing arm portion 32 such that a distal end 331 of the press arm portion 33 is disposed adjacent to and extends above the card slot 210.

Figure 8:
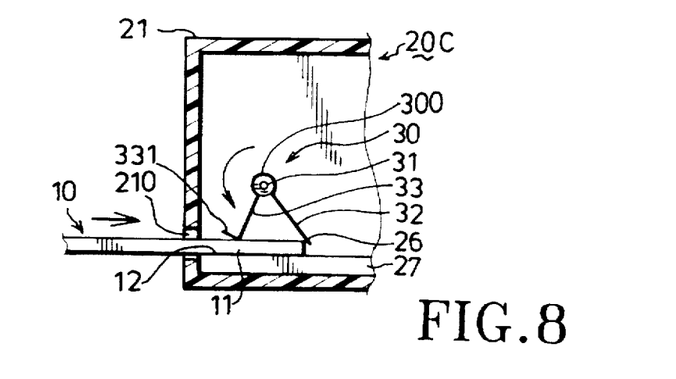
FIG. 8 illustrates how electrical connection between conductive stripes of an audio unit and an identification label on a control card is achieved in the third preferred embodiment.

Referring to FIG. 8, when the edge margin 11 of one of the control cards 10 is extended into the card slot 210, the edge margin 11 abuts against the swing arm portion 32 of the push member 30 and causes the sleeve portion 300 to rotate about the axle 31, thereby causing the distal end 331 of the press arm portion 33 to push the edge margin 11 toward the conductive stripes 26 so as to establish proper electrical contact between the identification label 12 and the conductive stripes 26.

Figure 9:
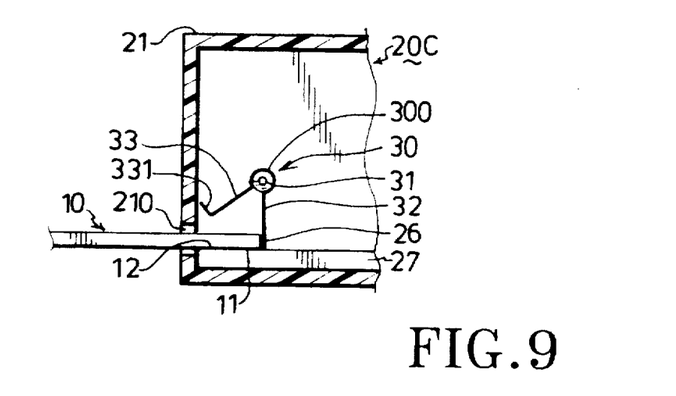
FIG. 9 illustrates movement of a push member when the control card is removed from the audio unit in the third preferred embodiment.

Referring to FIG. 9, when the control card 10 is pulled out of the card slot 210, friction between the distal end 331 of the press arm portion 33 and the edge margin 11 of the control card 10 will cause the sleeve portion 300 to rotate about the axle 31 in an opposite direction, thereby permitting the release of the control card 10 from the audio housing 21. A spring (not shown) may be connected to the sleeve portion 300 and the axle 31 to bias the push member 30 in the position shown in FIG. 7.

Figure 10:
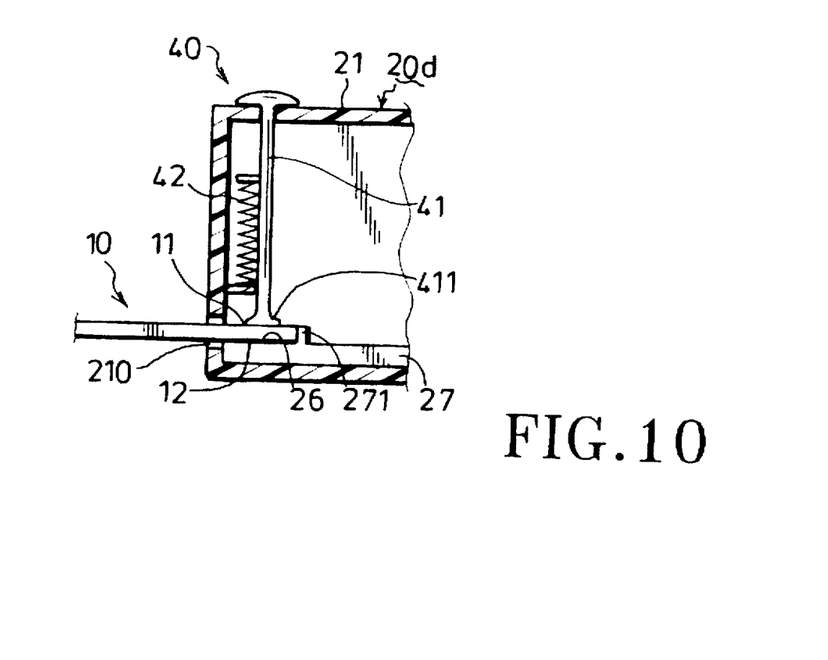
FIG. 10 is a schematic view of the fourth preferred embodiment of an audio device according to the present invention.

FIG. 10 illustrates the fourth preferred embodiment of an audio device according to the present invention. Like the third preferred embodiment described beforehand, the audio unit 20d is provided with a push assembly which pushes the edge margin 11 of an inserted one of control cards 10 toward the conductive stripes 26 that are printed on the circuit board 27 in the audio housing 21 so as to establish proper electrical contact between the identification label 12 on the bottom side of the edge margin 11 and the conductive stripes 26. In this embodiment, the push assembly is formed as a spring-loaded push rod 40 which includes a vertical push rod member 41 that is mounted movably on the audio housing 21 and that has an operating end portion 410 disposed outside the audio housing 21 and a press end portion 411 disposed above the conductive stripes 26 in the audio housing 21, and a spring 42 for biasing the push rod member 41 upwardly. A limiting member 271 is provided on the circuit board 27 for limiting entry of the edge margin 11 of the control card 10 into the audio housing 21 in order to ensure that the identification label 12 of the inserted control card 10 registers with the conductive stripes 26.

In use, after the edge margin 11 of one of the control cards 10 has been extended into the card slot 210, application of pressure on the operating end portion 410 of the push rod member 41 will move the latter downwardly into the audio housing 21 to enable the press end portion 411 of the same to push the edge margin 11 toward the conductive stripes 26 so as to establish proper electrical contact between the identification label 12 and the conductive stripes 26. As such, unlike the previous embodiments, the control cards 10 may be formed as flexible pieces instead of stiff pieces.

Figure 11:
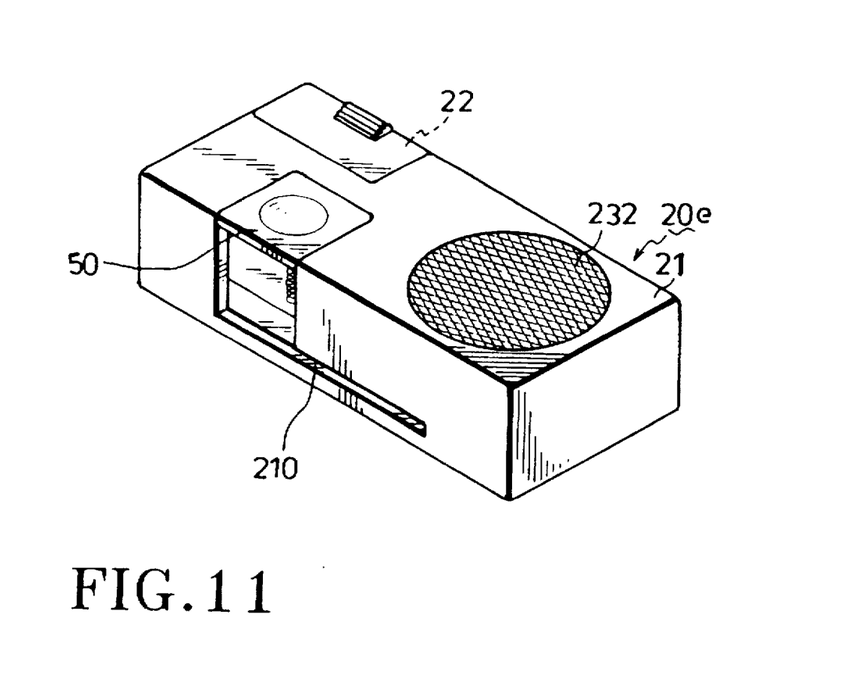
FIG. 11 is a perspective view of an audio unit of the fifth preferred embodiment of this invention.

FIG. 11 illustrates an audio unit 20e of the fifth preferred embodiment of an audio device according to the present invention. The audio unit 20e is generally similar to that shown in FIG. 1, except that the audio housing 21 is provided with a contact plate 50 which is connected pivotally thereto, and that the conductive stripes 26 are provided on a bottom side of the contact plate 50. The contact plate 50 is arranged to engage the identification label 12 on the top side of the edge margin 11 of the control card 11 that is inserted into the card slot 210 of the audio housing 21 when the contact plate 50 is pivoted toward the identification label 12 so as to permit electrical connection between the identification label 12 and the conductive stripes 26.

The use of an audio device having a contact plate with conductive stripes in combination with a book having pages with conductive identification labels has been disclosed in co-pending U.S. patent application Ser. No. 08/503,331, the disclosure of which is incorporated herein by reference.

Figure 12:
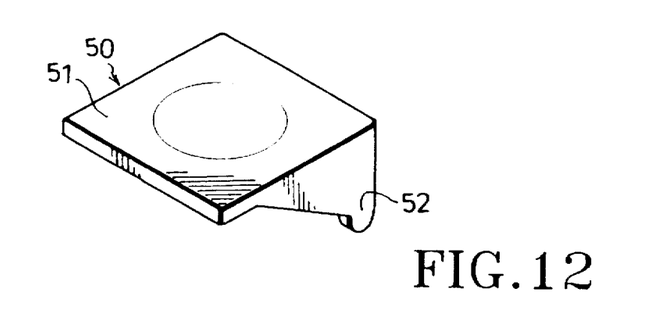
FIG. 12 is a perspective view of a control plate of the fifth preferred embodiment.
Figure 13:
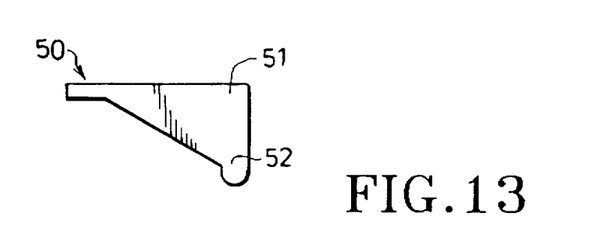
FIG. 13 is a side view of the control plate shown in FIG. 12.
Figure 14:
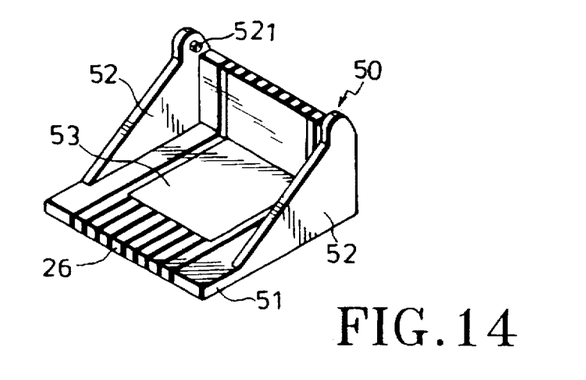
FIG. 14 is an inverted perspective view of the control plate shown in FIG. 12.
Figure 15:
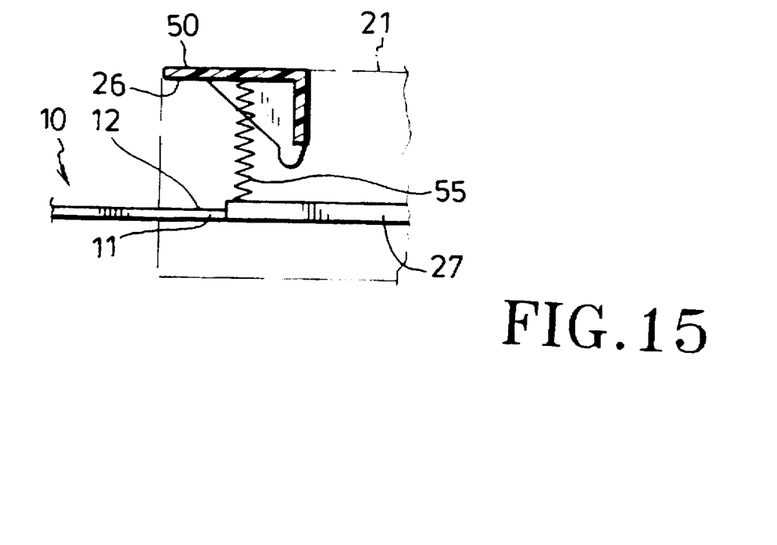
FIG. 15 is a schematic view illustrating the audio device of the fifth preferred embodiment.

Referring to FIGS. 12 to 14, the contact plate 50 includes a generally rectangular top wall 51 and two generally triangular lateral walls 52 extending from opposite sides of the top wall 51. Pins 521 project from the bottom ends of the lateral walls 52 for pivotal engagement with the audio housing 21. As shown in FIG. 15, a spring 55 is disposed between the top wall 51 of the contact plate 50 and the audio housing 21 so as to bias the contact plate 50 such that the top wall 51 is essentially flush with the top surface of the audio housing 21. In this embodiment, the conductive stripes 26 are printed on a flexible circuit board that is attached to the bottom side of the contact plate 50. An insulator sheet 53 is attached to the flexible circuit board for covering parts of the conductive stripes 26 to prevent undesired electrical contact there among.

Figure 16:
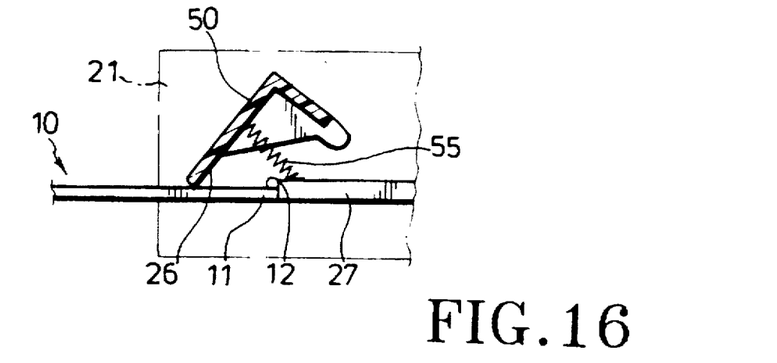
FIG. 16 is a schematic view which illustrates how electrical connection is established between conductive stripes on the control plate and an identification label on a control card in the fifth preferred embodiment.

Referring to FIG. 16, in use, when the contact plate 50 is pressed against the biasing force of the spring 55, the contact plate 50 pivots so that a portion of the top wall 51 extends over the edge margin 11 of the control card 10 to establish electrical contact between the conductive stripes 26 on the contact plate 50 and the identification label 12 on the control card 10. The spring 55 expands to return the contact plate 50 to the position shown in FIG. 15 when the pressing force is removed.

Figure 17:
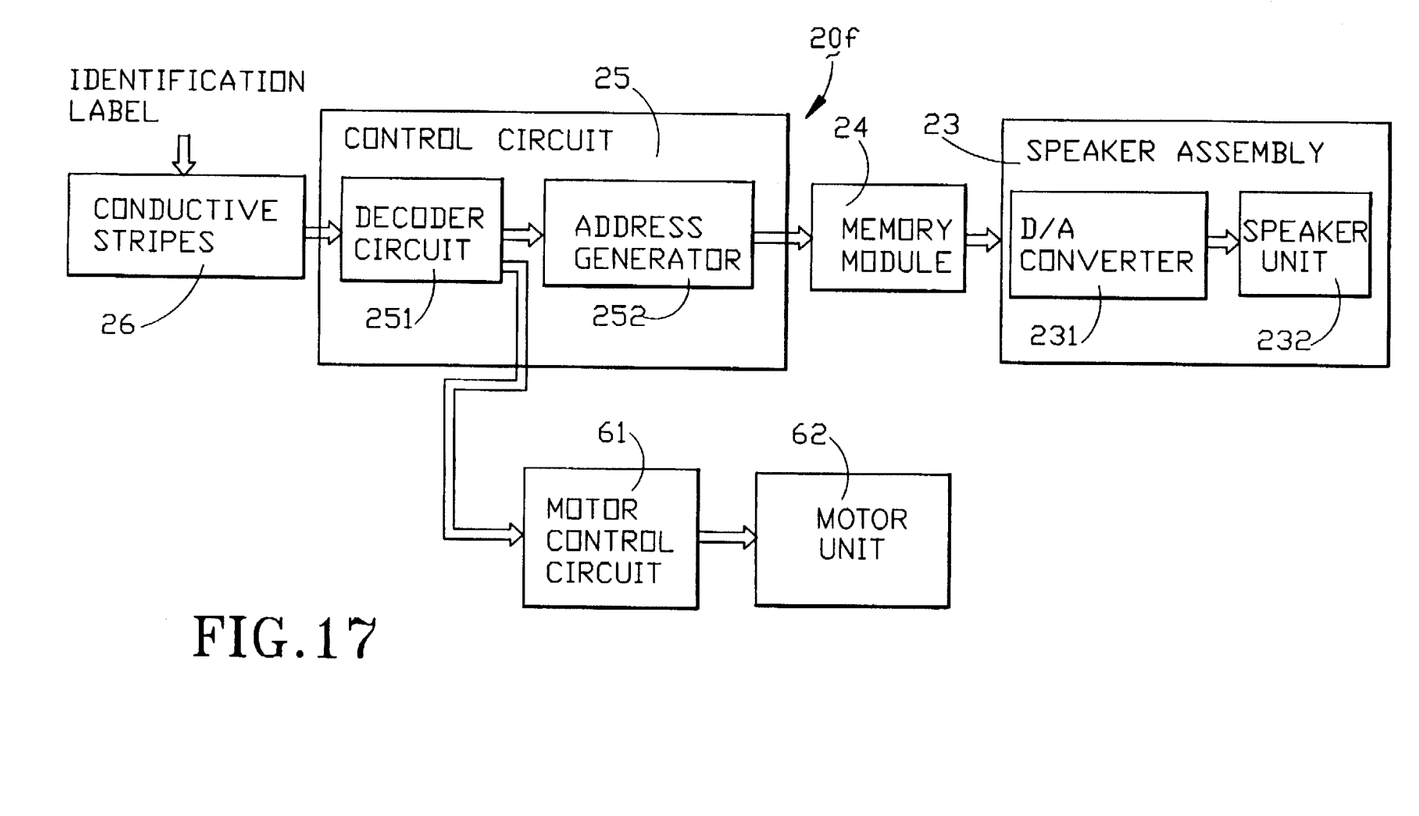
FIG. 17 is a schematic circuit block diagram of an audio unit of the sixth preferred embodiment of an audio device according to the present invention.

FIG. 17 illustrates a schematic circuit block diagram of an audio unit 20f of the sixth preferred embodiment of an audio device according to the present invention. As shown, the audio unit 20f of this embodiment further comprises a motor unit 62 and a motor control circuit 61 which interconnects the decoder circuit 251 and the motor unit 62. As such, the motor control circuit 61 is capable of controlling operation of the motor unit 62 in accordance with the card identifying signal that is received by the decoder circuit 251.

Figure 18:
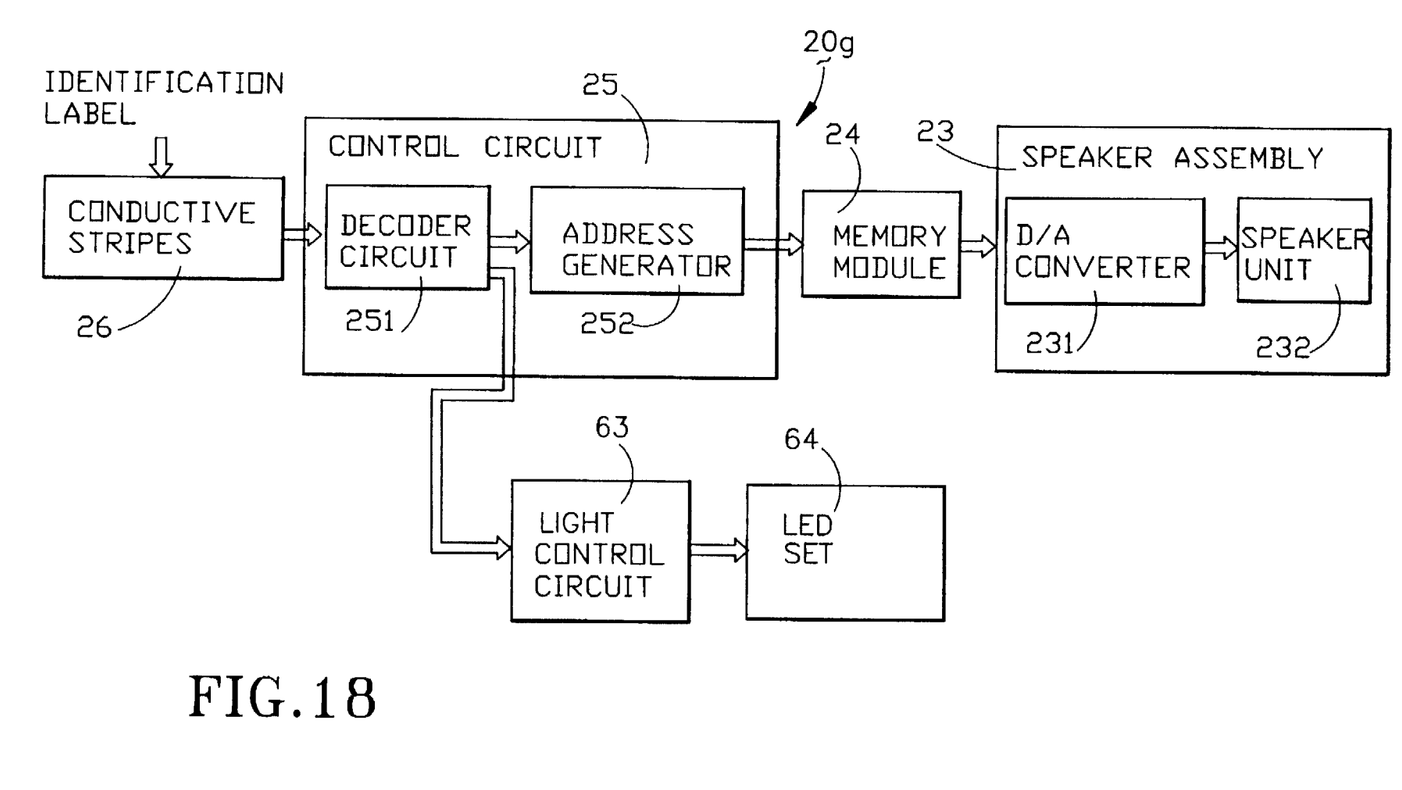
FIG. 18 is a schematic circuit block diagram of an audio unit of the seventh preferred embodiment of an audio device according to the present invention.

FIG. 18 illustrates a schematic circuit block diagram of an audio unit 20g of the seventh preferred embodiment of an audio device according to the present invention. As shown, the audio unit 20g of this embodiment further comprises a light emitting diode (LED) set 64 and a light control circuit 63 which interconnects the decoder circuit 251 and the LED set 64. The light control circuit 63 is capable of controlling operation of the LED set 64 in accordance with the card identifying signal that is received by the decoder circuit 251.

Figure 19:
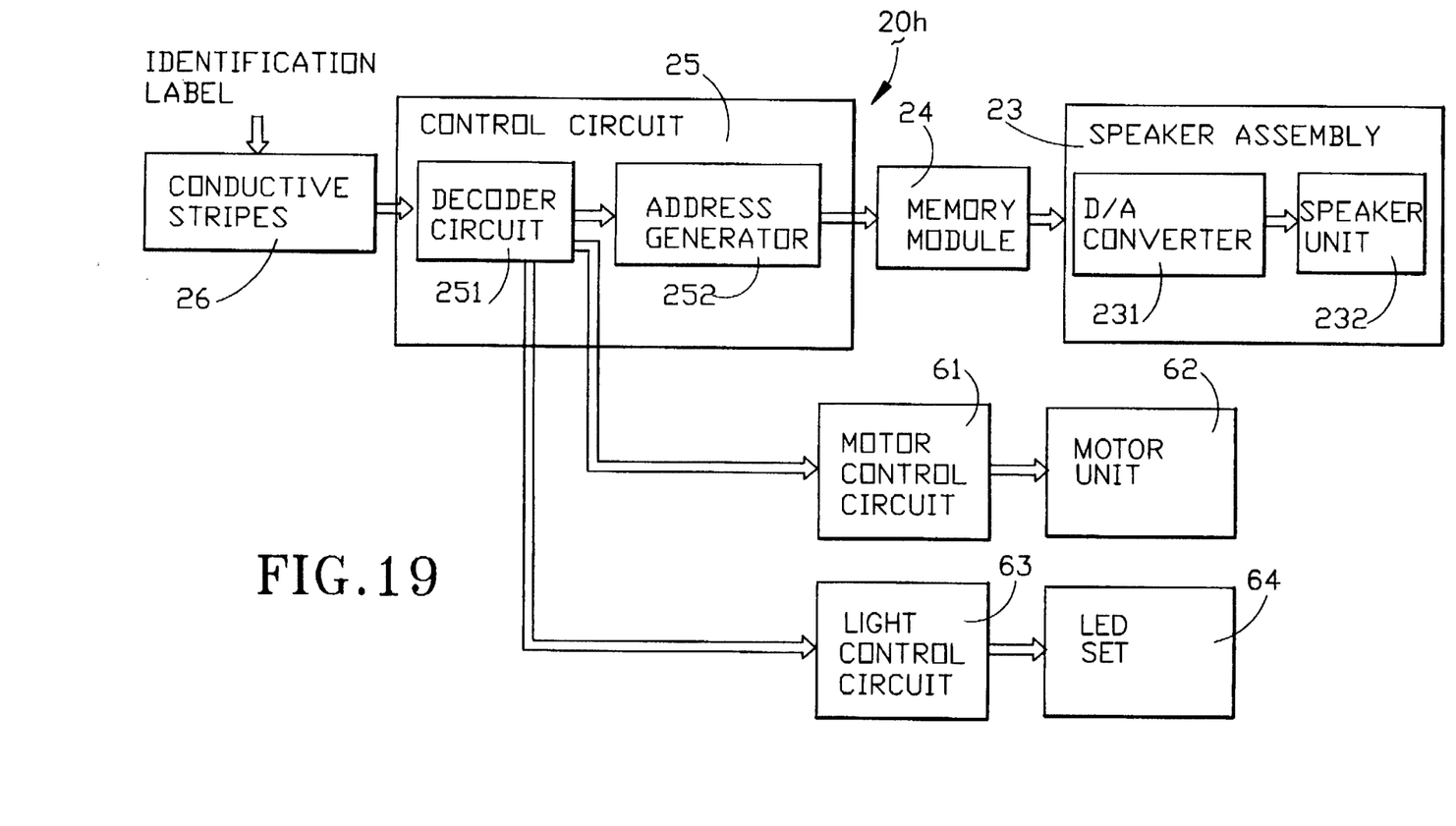
FIG. 19 is a schematic circuit block diagram of an audio unit of the eighth preferred embodiment of an audio device according to the present invention.

FIG. 19 illustrates a schematic circuit block diagram of an audio unit 20h of the eighth preferred embodiment of an audio device according to the present invention. As shown, the audio unit 20h of this embodiment further includes the motor unit 62 and the motor control circuit 61 of the sixth preferred embodiment, and the LED set 64 and the light control circuit 63 of the seventh preferred embodiment. The operation of the embodiment of FIG. 19 is similar to those shown in FIGS. 17 and 18 and will not be detailed further.

Figure 20:
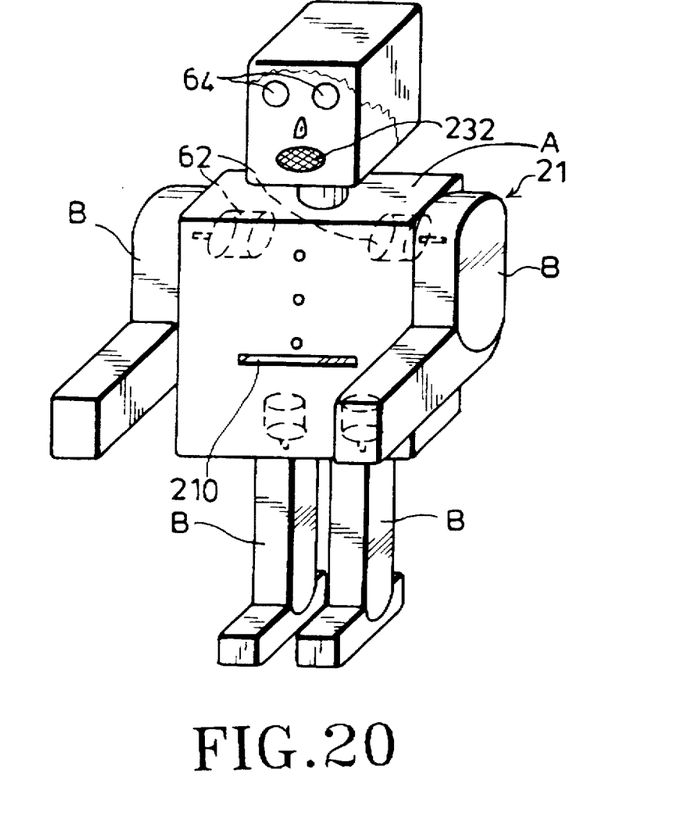
FIG. 20 is a perspective view which illustrates a toy that embodies the audio units shown in FIGS. 17 to 19.

FIG. 20 illustrates a preferred implementation of the embodiments shown in FIGS. 17 to 19. As illustrated, the audio housing 21 of the audio units 20f, 20g, 20h is in the form of a toy having a stationary part (A) and movable parts (B). Motor units 62 are mounted in the stationary part (A), which serves as a toy body, and are coupled to the movable parts (B), which serve as arms and legs of the toy. The card slot 210 is formed in the stationary part (A). The LED set 64 serves as the eyes of the toy, while the speaker unit 232 serves as the mouth of the toy. When a control card (not shown) is inserted into the card slot 210, the LED set 64 is activated, the speaker unit 232 generates the audible sound output in the manner mentioned beforehand, and the motor units 62 operate to result in movement of the toy in accordance with the inserted control card.

Figure 21:
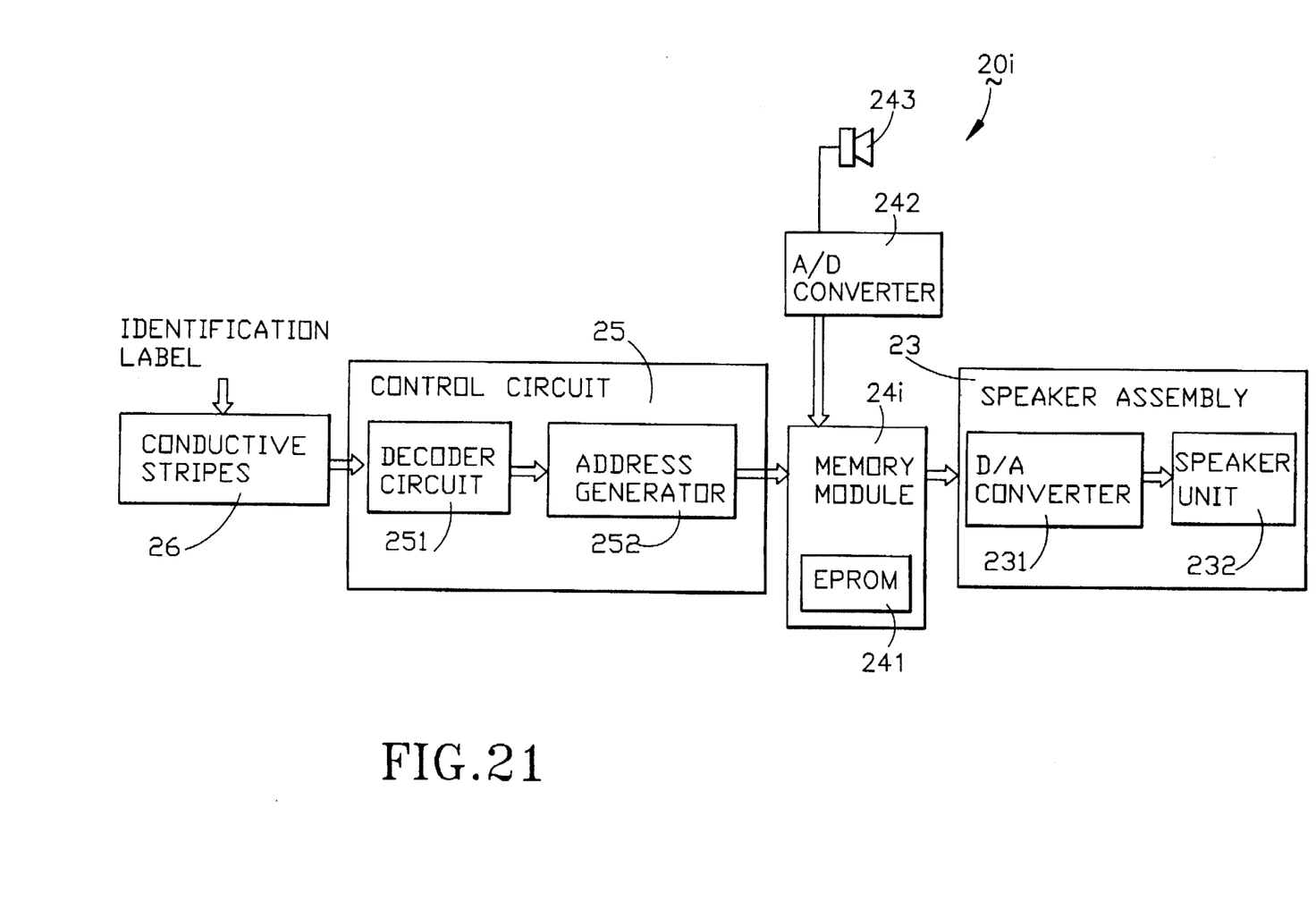
FIG. 21 is a schematic circuit block diagram of an audio unit of the ninth preferred embodiment of an audio device according to the present invention.

FIG. 21 illustrates a schematic circuit block diagram of an audio unit 20i of the ninth preferred embodiment of an audio device according to the present invention. As shown, a portion 241 of the memory module 24i of the audio unit 20i of this embodiment is implemented as an electrically programmable read-only flash memory (EPROM), preferably as an electrically erasable programmable read-only memory (EEPROM). A programming unit (not shown) of the control circuit 25 is operable so as to control programming, reading and erasing of the programmable portion 241. A sound pickup unit 243, such as a microphone, is connected electrically to the memory module 24i by means of an analog-to-digital converter 242. As such, electrical signals from the sound pick-up unit 243 that correspond to an audible sound input can be converted into a digital input signal for storage in the programmable portion 241. Therefore, when one of the control cards (not shown) that correspond to the programmable portion 241 of the memory module 24i is inserted into the card slot of the audio housing, the audible sound output that is generated is a user-specified sound output instead of a manufacturer-specified sound output. This enhances the commercial appeal of the audio device of the present invention.

It should be noted that the act of establishing electrical contact between the conductive stripes in the audio unit and the identification label on one of the control cards also results in a switching action for activating the audio unit so as to generate the audible sound output that corresponds to the inserted one of the control cards. No separate switch is needed to achieve this function, thereby resulting in a less complicated structure and operation. In addition, since no costly optical sensor is employed, the manufacturing costs can be reduced, and proper operation of the audio device can be ensured regardless of the ambient light conditions. The objects of the present invention are thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. An audio device comprising:
a plurality of control cards, each of which has an edge margin provided with an identification label for identifying said control cards, said identification label including an insulator portion and at least two electrically connected conductive strips on said insulator portion; and
an audio unit including
an audio housing formed with a card slot to permit extension of said edge margin of one of said control cards into said audio housing,
a memory module disposed in said audio housing for storing digitized audio data corresponding to said control cards therein,
a control circuit disposed in said audio housing and connected electrically to said memory module to control output of said digitized audio data from said memory module,
a plurality of electrically conductive stripes provided in said audio housing for connecting said control circuit to said identification label on said edge margin of said one of said control cards that is extended into said card slot of said audio housing, said conductive strips of said identification label connecting electrically at least two of said conductive stripes so as to generate a unique card identifying signal that is received by said control circuit and that is used to activate said control circuit for controlling said memory module to output a selected one of said digitized audio data in accordance with said card identifying signal, and speaker means disposed in said audio housing and connected electrically to said memory module for converting and reproducing said digitized audio data outputted by said memory module into an audible sound output.

2. The audio device of claim 1, wherein each of said control cards bears printed matter thereon, each of said digitized audio data corresponding to the printed matter on a respective one of said control cards.

3. The audio device of claim 1, wherein said memory module has a plurality of addressable memory regions for storing said digitized audio data therein, said control circuit including a decoder circuit which is connected electrically to said conductive stripes so as to receive said card identifying signal, and an address generator which is connected electrically to said decoder circuit and said memory module and which is activated by said decoder circuit so as to access one of said memory regions and output said digitized audio data that corresponds to said card identifying signal.

4. The audio device as claimed in claim 1, wherein said conductive stripes are formed as resilient conductive fingers.

5. The audio device as claimed in claim 1, further comprising limit means disposed in said audio housing adjacent to said card slot for limiting entry of said edge margin of said one of said control cards into said audio housing.

6. The audio device as claimed in claim 1, wherein said memory module is mounted removably and replaceably in said audio housing.

7. The audio device as claimed in claim 1, wherein said audio housing is formed with a memory slot, said memory module being formed as an integrated circuit card that is inserted removably and replaceably into said memory slot.

8. The audio device as claimed in claim 1, wherein said audio unit further includes a printed circuit board disposed in said audio housing and having said memory module, said control circuit and said speaker means mounted thereon, said conductive stripes being printed on said circuit board and extending toward said card slot, said identification label being provided on a bottom side of said edge margin of said control card.

9. The audio device as claimed in claim 8, wherein said audio housing is provided with pushing means for pushing said edge margin of said one of said control cards that is extended into said card slot of said audio housing toward said conductive stripes.

10. The audio device as claimed in claim 9, wherein said pushing means comprises:

an axle mounted in said audio housing parallel to said card slot and disposed adjacent to said card slot, said axle being disposed above said circuit board; and a push member having a sleeve portion sleeved rotatably on said axle, a swing arm portion extending radially and downwardly from said sleeve portion, and a press arm portion extending radially from said sleeve portion and forming an angle with said swing arm portion such that a distal end of said press arm portion is disposed adjacent to and extends above said card slot;

whereby, when said edge margin of said one of said control cards is extended into said card slot of said audio housing, said edge margin abuts against said swing arm portion and causes said sleeve portion to rotate about said axle, thereby causing said distal end of said press arm portion to push said edge margin toward said conductive stripes.

11. The audio device as claimed in claim 9, wherein said pushing means comprises a spring-loaded push rod mounted movably on said audio housing and operable so as to push said edge margin of said one of said control cards that is extended into said card slot of said audio housing toward said conductive stripes.

12. The audio device as claimed in claim 1, wherein said audio housing has a contact plate connected pivotally thereto, said conductive stripes being provided on a bottom side of said contact plate, said contact plate being operable so as to pivot toward said edge margin of said one of said control cards that is extended into said card slot of said audio housing so as to result in electrical contact between said identification label and said conductive stripes.

13. The audio device as claimed in claim 1, wherein said audio unit further includes a motor unit and a motor control unit which interconnects said control circuit and said motor unit and which controls operation of said motor unit in accordance with said card identifying signal.

14. The audio device as claimed in claim 1, wherein said audio unit further includes a light emitting set and a light control unit which interconnects said control circuit and said light emitting set and which controls operation of said light emitting set in accordance with said card identifying signal.

15. The audio device as claimed in claim 14, wherein said audio unit further includes a light emitting set and a light control unit which interconnects said control circuit and said light emitting set and which controls operation of said light emitting set in accordance with said card identifying signal.

16. The audio device as claimed in claim 15, wherein said audio housing has a stationary part with said motor unit mounted therein, and a movable part coupled to said motor unit.

17. The audio device as claimed in claim 13, wherein said audio housing has a stationary part with said motor unit mounted therein, and a movable part coupled to said motor unit.

18. The audio device as claimed in claim 3, wherein one of said memory regions is an electrically programmable memory region, said audio unit further including a sound pick-up unit for generating electrical signals corresponding to an audible sound input, and an analog-to-digital converter connected electrically to said sound pick-up unit for converting said electrical signals into a digital input signal, said control circuit being operable so as to control storage and retrieval of said digital input signal in said programmable memory region.

19. The audio device as claimed in claim 18, wherein said programmable memory region is electrically erasable.

* * * * *